United States Patent [19]

Kobayashi et al.

[11] 4,280,360
[45] Jul. 28, 1981

[54] FLUID MEASURING DEVICE

[75] Inventors: Hiroshi Kobayashi, Yokosuka; Toru Kita, Yokohama; Takeshi Fujishiro, Yokosuka, all of Japan

[73] Assignee: Nissan Motor Company, Limited, Yokohama, Japan

[21] Appl. No.: 70,258

[22] Filed: Aug. 27, 1979

[30] Foreign Application Priority Data

Aug. 25, 1978 [JP] Japan .................................. 53-103625
Mar. 15, 1979 [JP] Japan .................................. 54-29385

[51] Int. Cl.³ ............................................ G01F 15/00
[52] U.S. Cl. .................................... 73/198; 73/116; 138/37
[58] Field of Search ............. 73/198, 205 L, 231 R, 73/116, 861.22; 138/37

[56] References Cited

U.S. PATENT DOCUMENTS

| | | | |
|---|---|---|---|
| 2,270,141 | 1/1942 | Potter | 138/37 X |
| 2,929,248 | 3/1960 | Sprenkle | 138/37 X |
| 3,191,630 | 6/1965 | Demyan | 138/37 X |
| 3,349,619 | 10/1967 | Millar | 73/861.52 |
| 3,964,519 | 6/1976 | Debaum | 138/37 |
| 4,015,473 | 4/1977 | Kleuters | 73/861.52 |
| 4,142,413 | 3/1979 | Bellinga | 138/37 X |
| 4,210,016 | 7/1980 | Peter | 73/116 |

FOREIGN PATENT DOCUMENTS 117675 5/1930 Fed. Rep. of Germany ............. 73/198

*Primary Examiner*—Herbert Goldstein
*Attorney, Agent, or Firm*—Schwartz, Jeffery, Schwaab, Mack, Blumenthal & Koch

[57] ABSTRACT

A fluid measuring device comprises flow meter for measuring quantities of flow or flow rates of fluid and flow rectifiers arranged upstream and downstream of the flow meter, whose rectifier elements or cells are sized and positioned such that a ratio $W_1/D$ of a smaller width $W_1$ of the cells to an inner diameter D of a passage for the fluid is less than 0.2 and a ratio $L/W_1$ of a distance L between the flow meter and the upstream flow rectifier to the smaller width $W_1$ of the cell is within $5 \leq L/W_1 \leq 25$, thereby improving an accuracy of measurement without increasing losses of pressure.

15 Claims, 23 Drawing Figures

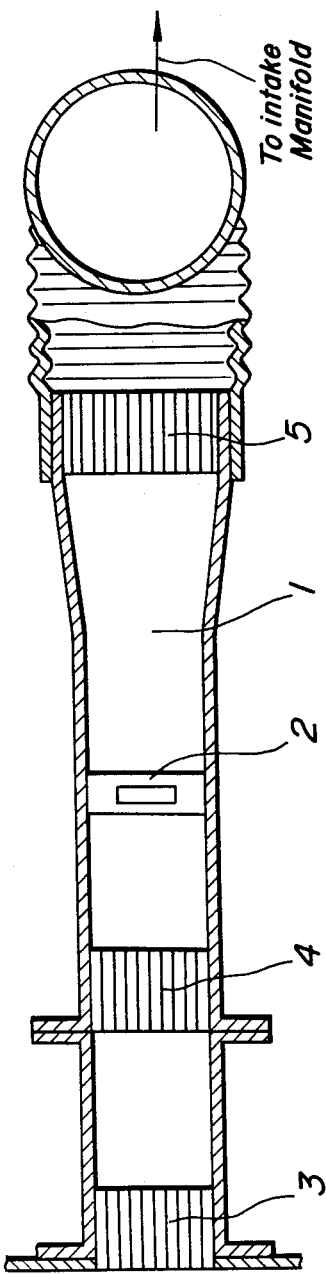
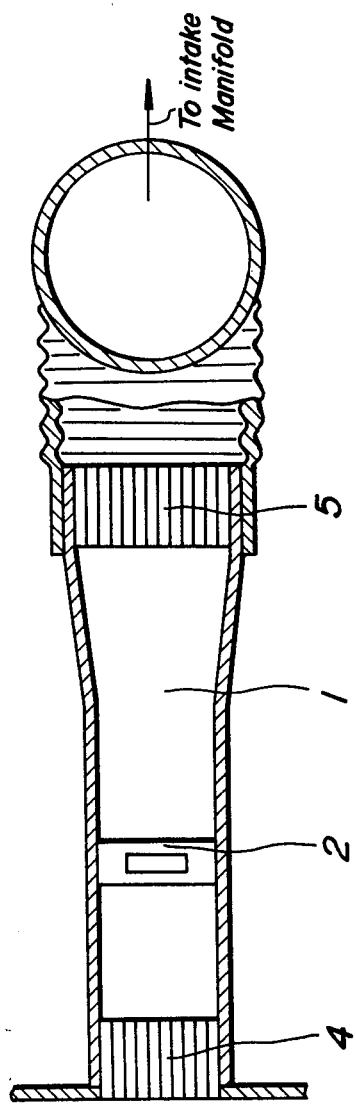

Present Invention (First Embodiment)

Present Invention (Second Embodiment)

FLUID MEASURING DEVICE

BACKGROUND OF THE INVENTION

1. Field of the Invention

The present invention relates to a fluid measuring device comprising flow rectifiers to determine quantities of fluid flow or flow rates precisely.

The term "flow rectifier" used herein means a device for restraining an occurrence of turbulence in a fluid flowing therethrough as little as possible to obtain a steady flow of the fluid.

2. Description of the Prior Art

In engines for automobiles or the like, electronically controlled fuel supply systems have been investigated and developed for controlling amounts of fuel supply by electrically detecting intake air flows in the engines in order to more lower the fuel consumption and more improve the exhaust gas composition.

As means for detecting quantities of air flows, there has been Karman vortices flow meter which directly or indirectly counts vortex rows to obtain a quantity of the air flow, which vortex rows alternately occur proportionally to a flow rate of the fluid to be measured and at a location downstream of an obstruction (for example a column-like body) located in a passage for the fluid.

In such a flow meter, however, errors often arise in measurement when the flow is disturbed to reduce the vortices. It is particularly acute in a great quantity of flow to lower the reliability of the flow meter. In order to effect a correct measurement of flow, therefore, it is required to introduce the flow into a flow meter under a sufficiently stable condition.

With an application of this flow meter to an air intake system for an automobile engine, an intake air hardly flows under a steady condition because of pulsations in the intake air and unavoidable curved or bent portions of the intake passage due to relative positions of other engine component members, so that the measured values generally include considerably great errors.

In order to suppress the disturbance in flow, it has been known to arrange a flow rectifier upstream of the flow meter. However, as the flow rectifier generally causes losses of pressure, an air intake system for an engine including a flow rectifier arranged therein would lower an output of the engine, so that the flow rectifying effect can be achieved only at the sacrifice of the engine output. In the prior art, moreover, as a single flow rectifier is located upstream of a flow meter, an accuracy of measurement is not improved so much by the flow rectifying effect notwithstanding increased losses of pressure due to the rectifier, with resulting increased air intake resistance.

In case of a wire screen which has been used as a flow rectifier, particularly, losses of pressure are remarkably increased because very fine mesh screens having opening ratios of in the order of 20-30% are generally used for this purpose in order to obtain the flow rectifying effect.

A sufficiently elongated straight passage could make stable the fluid flowing therethrough. Such an elongated passage, however, could not be often applied to apparatuses owing to a limitation of spaces. For example, with a fuel injection system for an automobile engine, a length of the passage in which a flow meter is located is extremely limited in the order of 20 cm because of various equipment arranged in a confined space.

Flow rectifiers have been used for this purpose, which include a number of rectifier elements or cells in the form of honeycomb, grate or the like.

The smaller the size of the cells, the greater is the rectifying effect of the rectifier but the larger is the loss of pressure. As the increasing rate of the loss of pressure is substantially proportional to a square on a reciprocal of the size of the cells, the loss of pressure rapidly increases as the size of the cells is smaller. Smaller cells than those sufficient to obtain the required accuracy of measurement would only increase the loss of pressure.

In addition, the rectifying effect of the flow rectifier is generally affected by a distance between it and a flow meter. The flow immediately downstream of the flow rectifier is not sufficiently rectified, whereas the flow remote from the rectifier is again distrubed in its longer passage although it has been once rectified.

SUMMARY OF THE INVENTION

It is an object of the invention to provide an improved fluid measuring device which overcomes the disadvantages and solves the problems in the prior art.

It is another object of the invention is to provide a fluid measuring device comprising flow rectifiers which exhibit their rectifying performances directly improving the accuracy of measurement and decrease losses of pressure as much as possible.

It is further object of the invention to provide a fluid measuring device capable of accurate measurements with the aid of effective rectifying operation of flow rectifiers defined by a ratio of a width of cells to a diameter of a passage for a fluid and a ratio of a distance between the rectifier and a flow meter to the width of the cells.

The invention will be more fully understood by referring to the following detailed specification and claims taken in connection with the appended drawings.

BRIEF DESCRIPTION OF THE DRAWINGS

FIG. 1 is a sectional view of one embodiment of the device according to the invention;

FIG. 2 is a sectional view of second embodiment of the device according to the invention;

FIG. 7b is a crosssectional view taken along a line 7b—7b in FIG. 7a;

FIG. 12b is a diagrammatical crosssectional view taken along a line 12b—12b in FIG. 12a;

FIG. 13b is a diagrammatical crosssectional view taken along a line 13b—13b in FIG. 13a.

DETAILED DESCRIPTION OF THE PREFERRED EMBODIMENT

Figure 3:
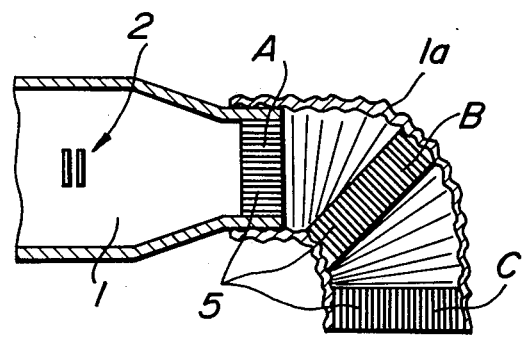
FIG. 3 is a sectional view of a passage having a bent to be applied with the present invention for explaining positions of the flow rectifier.

Referring to FIG. 1 illustrating a first embodiment of the invention, in a tubular passage 1 is arranged a Karman vortices flow meter 2 for measuring a quantity of flow flowing through the passage 1. First and second flow rectifiers 3 and 4 are arranged upstream of the flow meter 2 and a third flow rectifier 5 is arranged downstream thereof. Honeycomb structures or laminar tubes may be used as the flow rectifiers 3, 4 and 5 for obtaining uniform velocity distribution of the flow and restraining any turbulences in the flow depending upon conditions when they are used.

In this embodiment, the second flow rectifier 4 is arranged in a duct having a rectangular crosssection of 30×80 mm and located at a distance approximately 20-70 mm (the most preferably 30 mm) from the upstream end of the flow meter 2 to the downstream end of the rectifier 4. The first flow rectifier 3 is arranged at a distance approximately 20-70 mm from the upstream end of the second flow rectifier 4 to the downstream end of the first flow rectifier 3. It has been found in experiments that these distances are preferably 0.3D-1.3D, where D is an inner diameter of the tubular passage. In case of the rectangular duct as this embodiment, an equivalent diameter D' is used instead of D which is explained later.

It has been experimentally found that if the flow rectifiers upstream of the flow meter 2 are arranged too near (for example less than 10 mm apart from) the flow meter, their effects are scarcely expected, and if they are spaced more than 70 mm, the once rectified flow is again disturbed in the longer passage. Therefore, the flow rectifiers should be arranged within the above suitable distances.

FIG. 2 illustrates a second embodiment of the invention, wherein the first flow rectifier 3 is omitted in consideration of the kind of the flow meter 2 and required accuracies. Accordingly, at least two flow rectifiers 4 and 5 are needed for accomplishing the effect of the invention. The device including two flow rectifiers is generally used for this purpose of the invention.

According to the invention, when the first and second flow rectifiers 3 and 4 are arranged in the passage, the flow once rectified in the upstream rectifier is again rectified in the downstream rectifier, so that the rectifying effect would become higher in comparison with the case of the single flow rectifier upstream of the flow meter.

The third flow rectifier 5 is located at a distance 20-70 mm downstream of the flow meter 2 to obtain the rectifying effect in the fluid upstream of the third flow rectifier 5.

It has been found in inventors' experiments that the rectifying effect of the flow rectifier prevails not only in the fluid downstream thereof but also in the fluid upstream thereof. Particularly, the flow rectifiers arranged upstream and downstream of the flow meter 2 exhibit a great effect to restrain swells and revolving of the entire flow which would often occur in a passage including a curved tube, whereby the disturbance at the flow meter 2 can be remarkably restrained.

Figure 4:
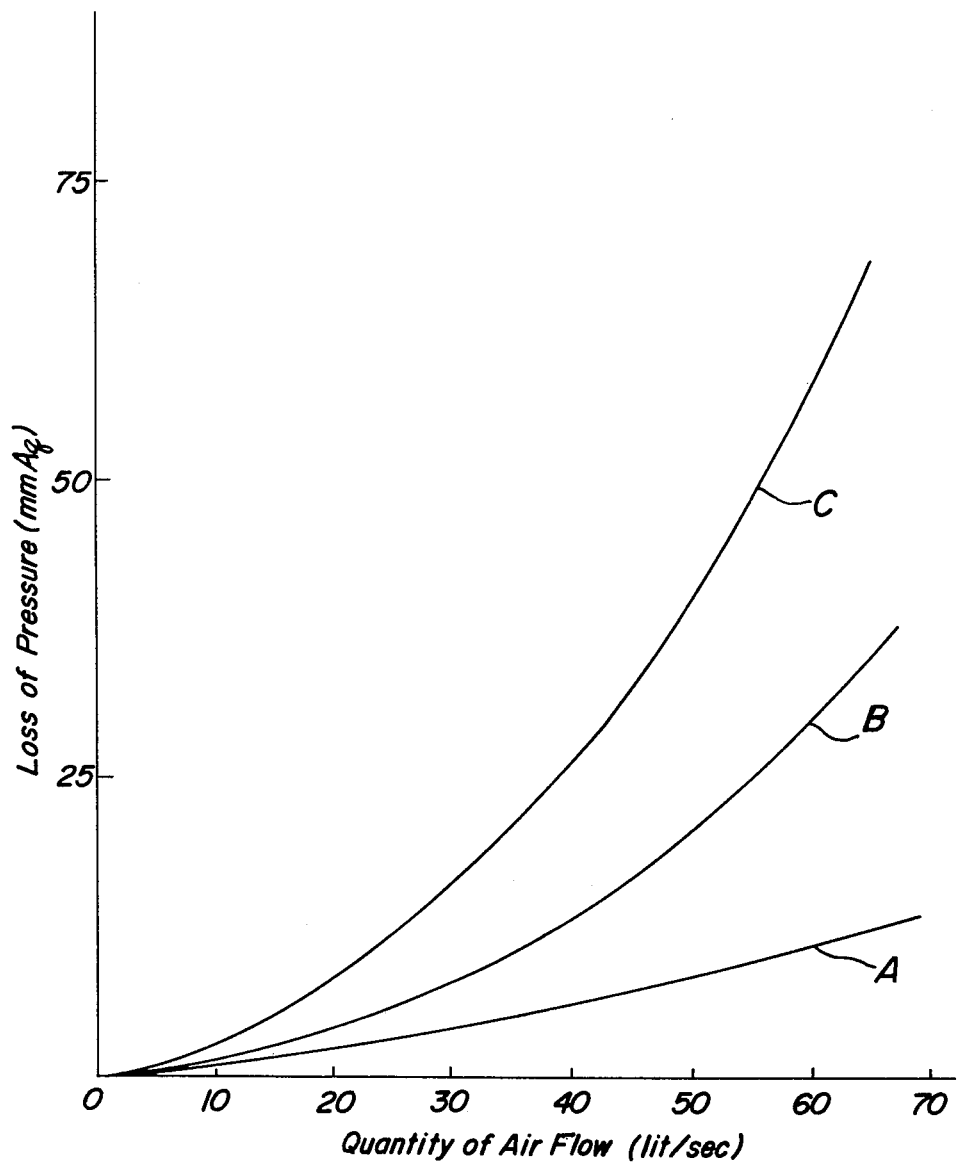
FIG. 4 is a graph illustrating relations between losses of pressure and the positions of rectifiers shown in FIG. 3.

In a flow passage having a curved tube 1a downstream of the flow meter 2 as shown in FIG. 3, the minimum loss of pressure is achieved by arranging the flow rectifier 5 at a position A immediately before the turning of the flow lines. The loss of pressure increases according to positions of the flow rectifier 5 in the order of the middle (position B) and the end (position C) of the turning of the flow (FIG. 4).

In the curved tube 1a, the loss of pressure would increase due to loss of energy resulting from peeling of vortices from walls of the curved tube. Therefore, the loss of pressure can be remarkably decreased by suppressing an occurrence of vortices with the aid of the flow rectifier 5 located immediately before the curved passage in spite of a resistance of flow in the flow rectifier.

In case of a fluid passage including a curved tube such as an intake passage for an automobile engine, therefore, it is the most preferable to arrange a flow rectifier 5 downstream of a flow meter 2 immediately before the curved tube 1a within the above distance.

If the curved tube 1a is located upstream of the flow meter 2, the flow rectifier should be arranged immediately after the turning of the flow to mainly aim the rectifying effect in the downstream flow.

Figure 5:
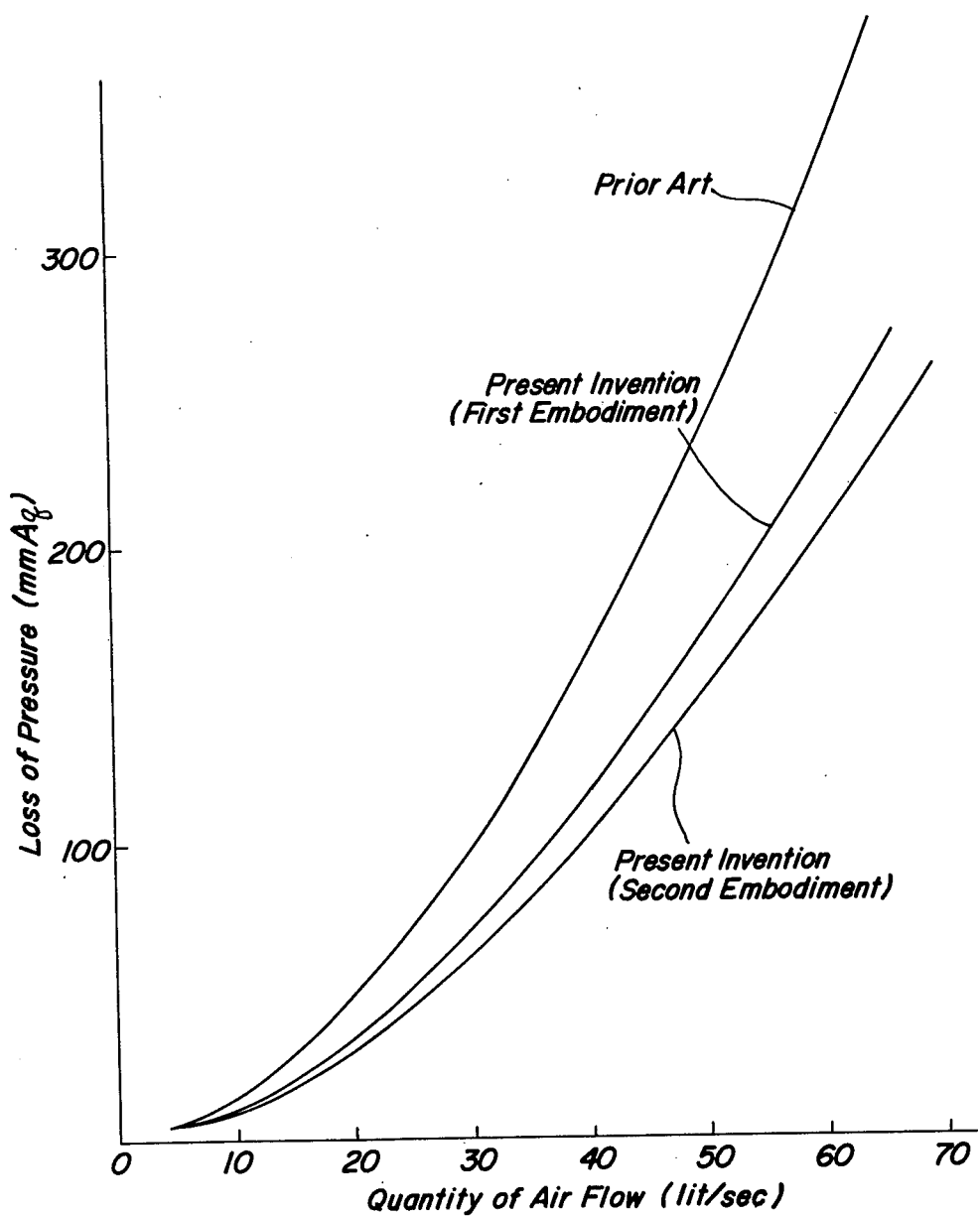
FIG. 5 is a graph in comparison of the present invention with the prior art in losses of pressure.

As can be seen from the above description, the device according to the invention exhibits the great rectifying effect with little loss of pressure as shown in FIGS. 5 and 6 in spite of many (three) flow rectifiers 3, 4 and 5 (in the form of the honeycomb structure), different from the prior art including only one flow rectifier (in the form of a honeycomb structure with a wire screen) arranged upstream a flow meter.

Figure 6A:
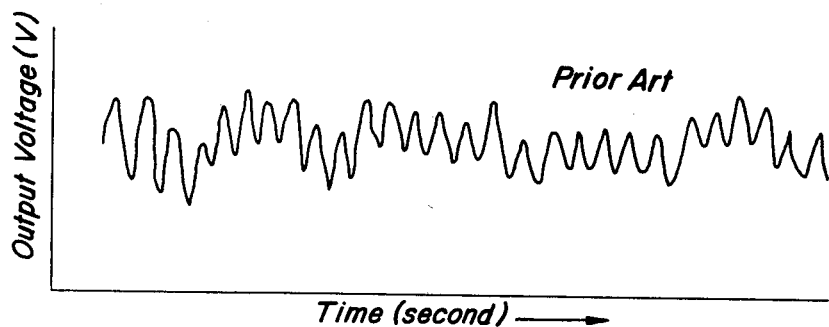
FIGS. 6a, 6b and 6c illustrate outputs of Karman vortices flow meter in comparison of the prior art and the present invention.
Figure 6B:
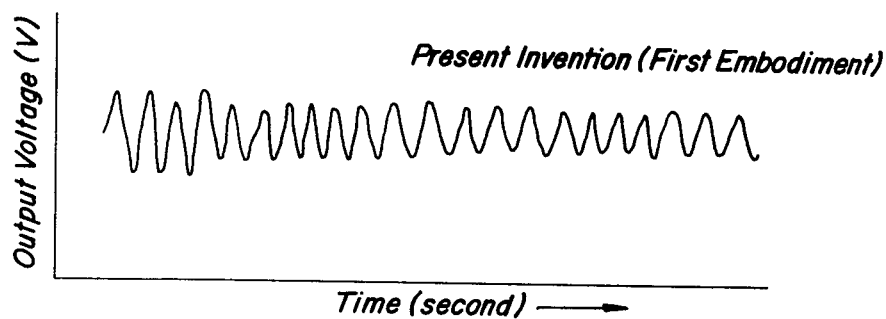
Figure 6C:
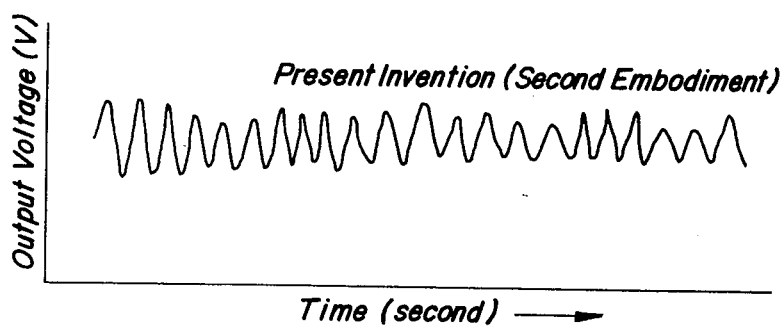
Figure 8A:
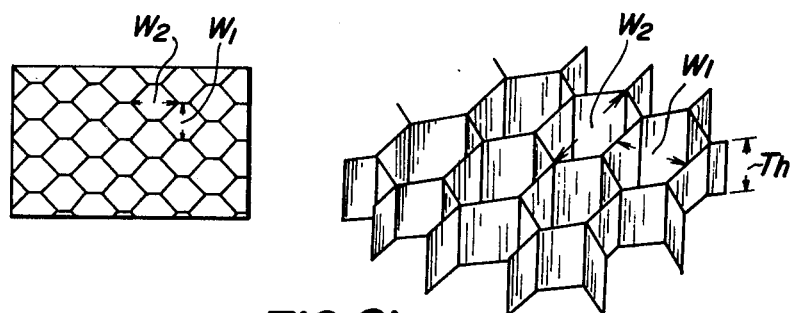
FIGS. 8a–8d illustrate various shapes of rectifier elements or cells used in the device according to the invention.
Figure 8B:
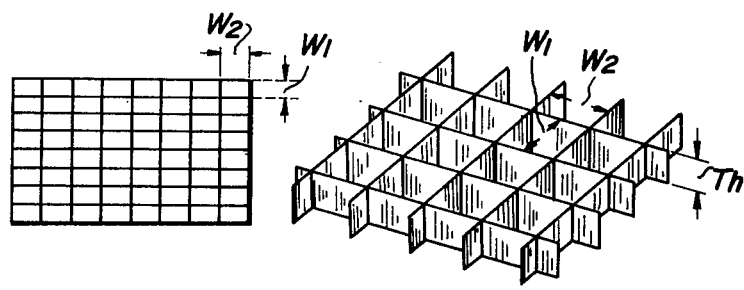
Figure 8C:
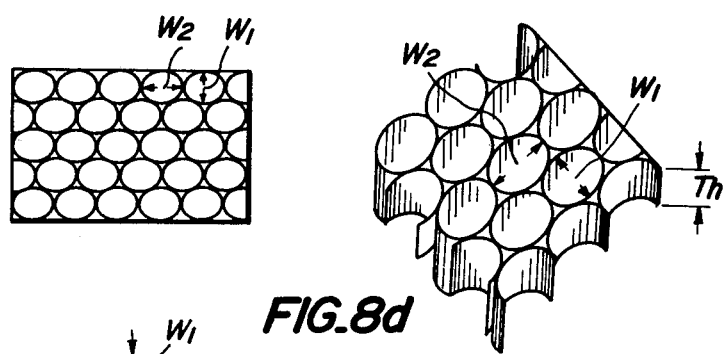
Figure 8D:
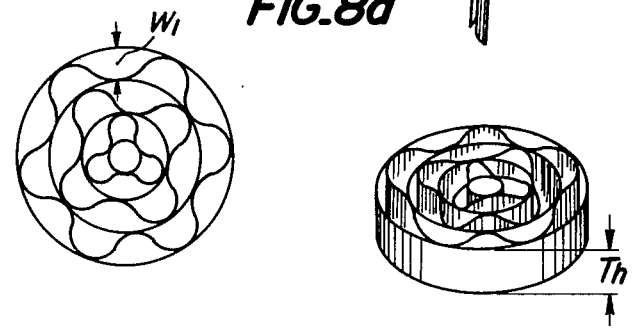

FIGS. 6a-6c illustrate a comparison of flow rectifying effects of the present invention (FIGS. 6b and 6c) with the prior art (FIG. 6a) with the output characteristic of the Karman vortices flow meter. In these graphs, variations in output wave are shown with a constant quantity of flow 70 lit/sec. Accordingly, the less the variation in output wave, the higher the accuracy of the device. The results of FIGS. 6a-6c show the great rectifying effect of the flow rectifier arranged downstream of the flow meter according to the present invention, wherein the output of the flow meter is very stable.

The flow meter may be other than the Karman vortices flow meter and as well as such a flow meter whose accuracy is susceptible to any turbulence in flow.

Configurations and dimensions of the device, and particularly the flow rectifier according to the invention will be explained hereinafter.

Figure 7B:
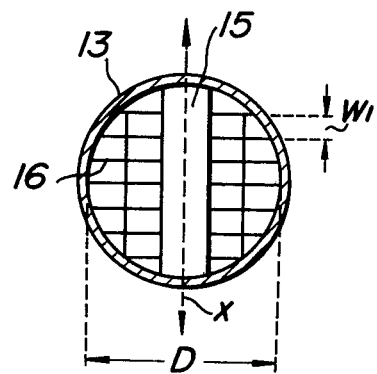
Figure 7A:
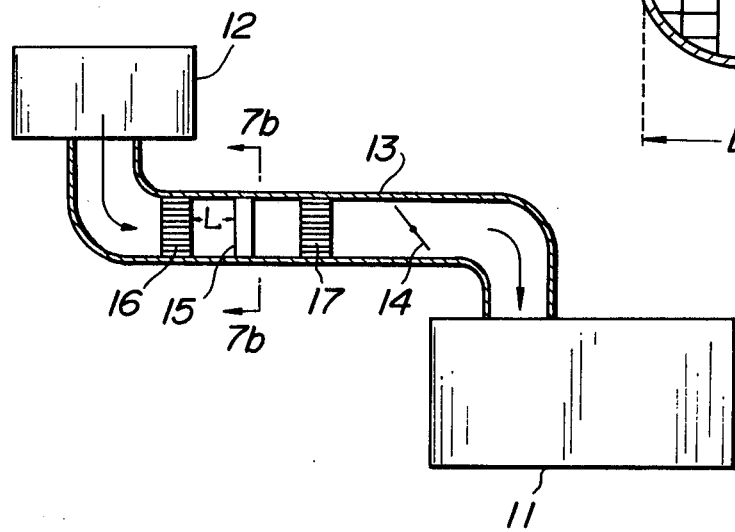
FIG. 7a is a sectional view of an air intake passage for an engine to be applied of the device according to the invention.

Referring to FIGS. 7a and 7b, an engine 11 comprises an air cleaner 12, an intake duct 13 including therein a throttle valve 14. A vortex generator 15 of a Karman vortices flow meter is arranged in the intake duct 13 and flow rectifiers 16 and 17 are located upstream and downstream of the flow meter. FIG. 7b exemplarily illustrates a flow rectifier having grate-like or rectangular elements or cells.

The suction or intake air flows through the air cleaner 12, flow rectifier 16, vortex generator 15, flow rectifier 17 and throttle valve 14 into the engine 11 as shown in arrows in FIG. 7a. The vortex generator 15 produces Karman vortices at intervals or periods inversely proportional to flow rates (or quantities of flow) of the suction air. The quantity of the suction air flow can be determined by detecting the periods or frequencies of the Karman vortices as by means of a vortex detector having a heating wire.

It has been found in inventors' experiments that the rectifying effect of the above suction air flow meter is greately affected with a ratio ($W_1/D$) of a width $W_1$ of the rectifier cell to a diameter D of the intake duct and a ratio ($L/W_1$) of a distance L from the flow rectifier to the vortex generator to the width $W_1$ of the cell.

FIGS. 8a–8d are diagrammatical front elevation and partially enlarged perspective views of various kind of flow rectifiers whose cells are honeycomb (FIG. 8a), grate or rectangular (FIG. 8b) and elliptical (FIG. 8c) and forms defined alternately by concentric circular and corrugated walls (FIG. 8d), respectively. The opening ratio of the flow rectifier used herein, which is a ratio of sum of opening areas of the cells to a sectional area of the rectifier, is substantially 90%. In any flow rectifiers shown in FIGS. 8a–8d, when the ratio $W_1/D$ becomes larger than a determined value, the rectifying effect rapidly decreases. However, if the ratio $W_1/D$ becomes smaller than a determined value, the rectifying effect is not improved but the loss of pressure increases.

On the other hand, when the ratio $L/W_1$ is within a determined range, a high rectifying effect can be obtained, which, however, decreases as the ratio $L/W_1$ varies out of the determined range.

Accordingly, a flow rectifier having a ratio $W_1/D$ less than the determined value and a ratio $L/W_1$ within the determined value exhibits an improved rectifying effect.

The width $W_1$ of the cell herein is the smaller width of the cell (the distance between opposite sides of the honeycomb hexagons, the length of short sides of the rectangles or the length of minor axes of the ellipses).

Figure 9A:
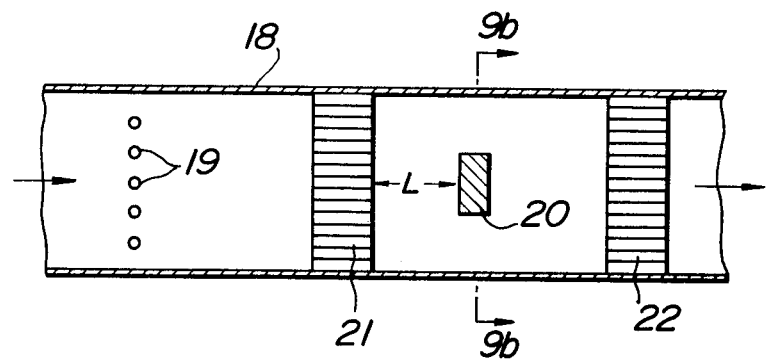
FIGS. 9a, 9b and 9c illustrate passages for the fluid used for experiments to determine the size and distance of the rectifiers used in the present invention.
Figure 9B:
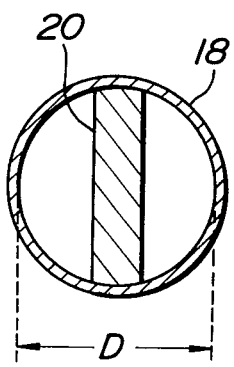
Figure 9C:
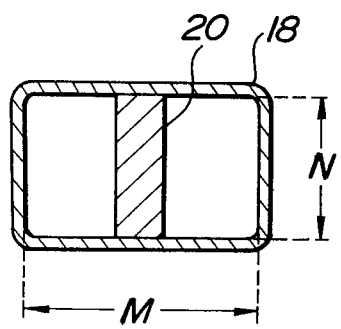

Referring to FIGS. 9a–9c illustrating one example of an arrangement used for the above experiments, in an intake duct 18 are arranged a turbulence grate 19 for intentionally disturbing the flow in order to clarify the rectifying effect, a vortex generator 20 of a Karman vortices flow meter and flow rectifiers 21 and 22. In case of a circular crosssectional intake duct, D is the diameter itself of the intake duct (FIG. 9b). In case of a rectangular crosssectional duct, D is a diameter D' of a circle whose area is equal to that of the rectangular duct ($D' = 2\sqrt{MN/\pi}$, where M and N are lengths of sides of the rectangle).

Figure 10:
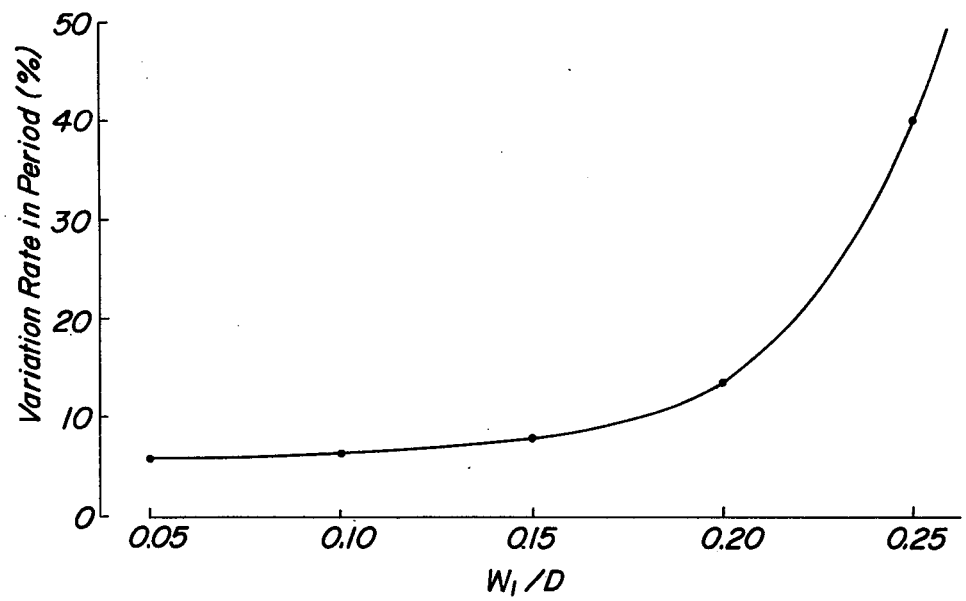
FIG. 10 illustrates the relation between the size of cells and the diameter of the passage.

FIG. 10 illustrates a relation between the ratio $W_1/D$ and variation rate in period % measured by means of the arrangement shown in FIG. 9. In this case, the distance L is 35 mm and the size W is 3.2 mm and therefore $L/W_1$ is constant. The variation rate in period is represented by $\sigma/T \times 100(\%)$, where T is average period and $\sigma$ is standard deviation. The higher percentage of the variation rate indicates a greater disturbance in flow and hence a less rectifying effect.

As can be seen from the curve in FIG. 10, in the range of the ratio $W_1/D$ more than 0.2, the variation rate in period becomes rapidly greater to lower the rectifying effect. Accordingly, the ratio $W_1/D$ should be set less than 0.2. However, the variation rate does not change so much within the range of the ratio less than 0.2. It should be, therefore, understood that when the ratio $W_1/D$ is as large as possible but less than 0.2, the loss of pressure can be decreased without affecting the rectifying effect.

Figure 11:
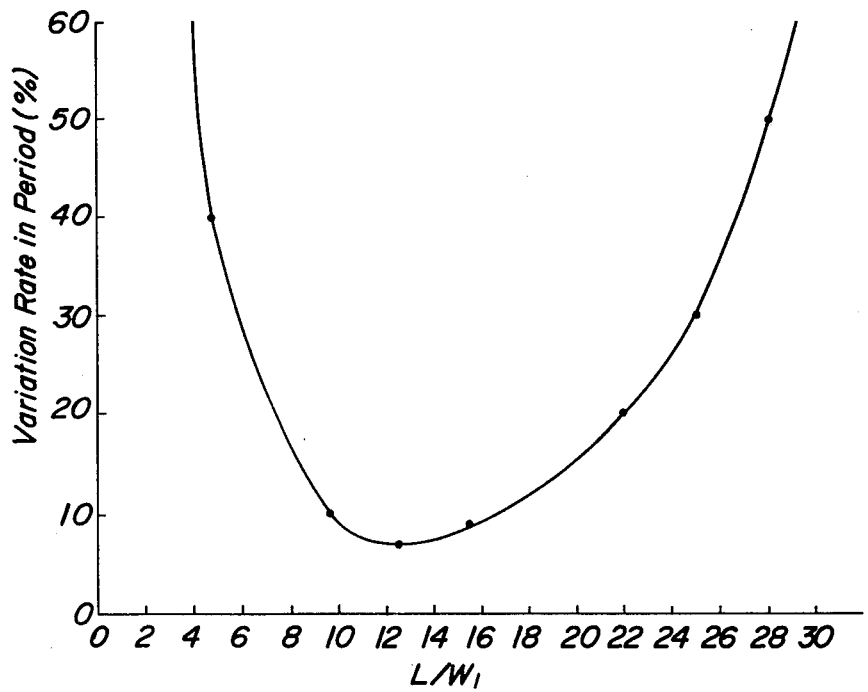
FIG. 11 illustrates the relation between the distance from the flow rectifier to the vortex generator and the size of cells.

FIG. 11 illustrates a relation between the ratio $L/W_1$ and variation rate in period % measured by means of the arrangement shown in FIG. 9a. In this case, the intake tube has a rectangular crosssection 30×80 mm, the equivalent diameter D' is 57 mm and the width $W_1$ is 3.2 mm ($\frac{1}{8}$").

As can be seen from FIG. 11 the variation rate in period is the minimum within the range 10–16 of $L/W_1$ and increases rapidly within the range of $L/W_1$ more than 25 and particularly less than 5. Accordingly, the ratio of $L/W_1$ should be set within $5 \leq L/W_1 \leq 25$ and more particularly within $10 \leq L/W_1 \leq 16$ which would bring about particularly preferable result.

Figure 12A:
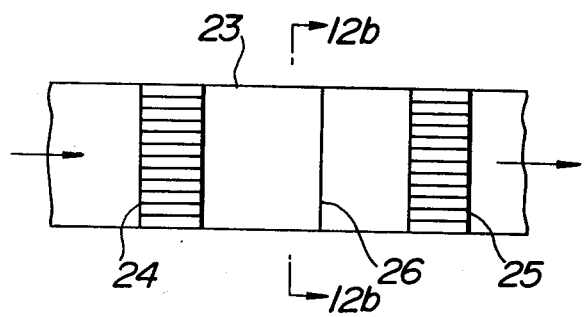
FIG. 12a is a diagrammatical sectional view of another embodiment of the invention.
Figure 12B:
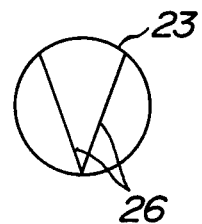

FIGS. 12a and 12b illustrate one embodiment of the device using a thermal-type flow meter as a detector, wherein within an intake duct 23 are arranged flow rectifiers 24 and 25 and a resistance wire 26.

An electric current is caused to pass through the resistance wire 26 to heat it and controlled so as to keep it at a constant temperature. The fluid flowing through the intake duct 23 contacts the resistance wire 26, it is cooled to some extent to change the electric current to be supplied thereto. As there is a relation $I^2 \propto a(1+b\sqrt{V})$ where I is electric current, V is flow rate of the fluid and a and b are constants, the flow rate V (or quantity of flow) can be determined by the measured electric current I.

Figure 13A:
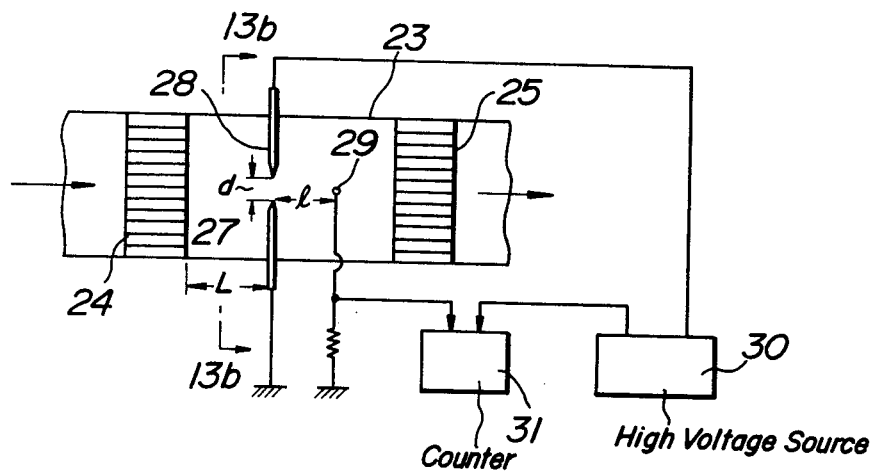
FIG. 13a is a diagrammatical sectional view of further embodiment of the invention.
Figure 13B:
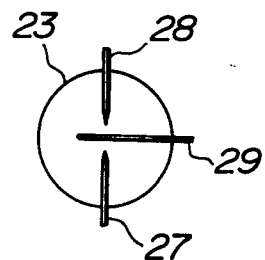

FIGS. 13a and 13b illustrate another embodiment of the device using an ion transfer-type flow meter as a detector, which comprises the like parts designated by the same references as those in FIG. 12a and discharge electrodes 27 and 28, a detection electrode 29, a high voltage source 30 and a counter 31.

A high voltage is intermittently supplied to the discharge electrodes 27 and 28 from the high voltage source 30 to produce therebetween corona discharges. The corona discharges produce ions which move downstream together with the fluid flow and collected at the detection electrode 29. The time $\tau$ for the movement of the ions from the discharge electrodes 27 and 28 to the detection electrode 29 is detected in the counter 31 to determine the flow rate V of the fluid.

In other words, as there is a relation $V = k(l/\tau)$, where l is the distance between the discharge electrodes and the detection electrode and k is a constant independent of the distance l, the flow rate V will be determined by the time $\tau$. The constant k is dependent upon a clearance d between the discharge electrodes 27 and 28 and decreases as the clearance d increases. The value k is generally less than one owing to an influence of an electric field, an extension of the discharge path due to scattering or the like.

In the embodiments shown in FIGS. 12 and 13, the ranges of $W_1/D \leq 0.2$ and $5 \leq L/W_1 \leq 25$ are preferable to obtain the best results.

The device according to the invention whose dimensions are selected within the determined ranges can minimize the losses of pressure to a minimum possible extent and improve the flow rectifying effect with the effective utilization of spaces and the accuracy of measured quantity and velocity of flow.

Referring back to FIGS. 7 and 8, in any flow rectifiers the rectifying effect is generally improved without increasing the loss of pressure and a pulse absent rate (which represents a degree of disturbance in flow) is lower when the length $W_1$ in a direction of a support axis X of the vortex generator (the axis parallel to a line connecting the supported positions of the vortex generator) is shorter than the length $W_2$ perpendicular to the length $W_1$. It holds true in cases of the rectifiers including honeycomb, rectangular and elliptical cells.

Furthermore, it has been found in the inventors' experiments that the rectifiers having the ratio $W_1/W_2$ within 0.5–0.8 exhibits a more improved effect of the invention. When the ratio $W_1/W_2$ is less than 0.5, the loss of pressure in the rectifier increases whereas when the ratio is more than 0.8, the rectifying effect decreases.

Moreover, it has been found in the inventors' experiments that when a ratio of a thickness Th to the width $W_1$ is less than 3, the rectifying effect rapidly decreases and if the ratio is more than 3, the rectifying effect is not improved so much. Therefore, the ratio $Th/W_1$ is preferably as small as possible but more than 2.5 in consideration of the loss of pressure and effective utilization of the space in an intake duct.

In case of the device including the single flow rectifier 22 downstream of the flow meter without using the rectifier 21, if the ratio $Th/W_1$ is more than 5, sufficient rectifying effect can be obtained.

When the ratio $Th/W_1$ is 3.2 and the thickness Th is in the order of 10 mm, the loss of pressure is very small even if the quantity of air flow becomes large. As the thickness Th becomes larger, the loss of pressure rapidly increases in particular with a great quantity of air flow. Accordingly, the thickness Th of the rectifier is preferably as small as possible within the range of the ratio $Th/W_1$ as above described. It has been found in the experiments that the effect of the invention can be improved by selecting approximately 3 of the ratio $Th/W_1$ in the upstream rectifier and approximately 6 of the ratio in the downstream rectifier.

The above relation of $Th/W_1$ holds true in all the honeycomb, rectangular, elliptical and concentric wave shaped rectifiers as shown in FIG. 8.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A fluid measuring device comprising measuring means for measuring any one of quantity of flow and flow rate in a tubular passage for a fluid to be measured, and flow rectifiers arranged upstream and downstream of said measuring means, wherein said direction of the fluid flow is changed downstream of the measuring means and the flow rectifier is arranged immediately upstream of the location where the direction is changed.

2. A fluid measuring device as set forth in claim 1, wherein a distance from said measuring means to said downstream flow rectifier is 0.3–1.3 times an inner diameter of said tubular passage.

3. A fluid measuring device as set forth in claim 1, wherein a distance from said measuring means to said upstream flow rectifier is 0.3–1.3 times an inner diameter of said tubular passage.

4. A fluid measuring device as set forth in claim 1, wherein two flow rectifiers are arranged upstream of said measuring means.

5. A fluid measuring device as set forth in claim 1, wherein said flow rectifiers have honeycomb cells.

6. A fluid measuring device as set forth in claim 1, wherein said flow rectifiers have rectangular cells.

7. A fluid measuring device as set forth in claim 1, wherein said flow rectifiers have elliptical cells.

8. A fluid measuring device as set forth in claims 5, 6 or 7, wherein a ratio $W_1/D$ of a smaller width $W_1$ of said cells to an inner diameter D of said tubular passage is less than 0.2.

9. A fluid measuring device as set forth in claim 8, wherein in case of a rectangular crosssectional passage, instead of said inner diameter D, use is made of a diameter D' of a circle whose area is equal to a crosssectional area of said rectangular passage.

10. A fluid measuring device as set forth in claim 1, wherein said flow rectifiers have cells defined alternately by concentric circular and corrugated walls.

11. A fluid measuring device as set forth in claim 1, wherein said measuring means is a Karman vortices flow meter.

12. A fluid measuring device as set forth in claim 1, wherein said measuring means is a thermal-type flow meter whose heating body is arranged in said passage for the fluid and a heating therefrom is detected to determine the quantity of flow.

13. A fluid measuring device as set forth in claim 1, wherein said measuring means is an ion transfer-type flow meter comprising discharge electrodes and a detection electrode arranged in said passage for the fluid, and a period of time during which ions produced by discharging of the discharge electrodes arrive at the detection electrode is detected to determine the quantity of flow.

14. A fluid measuring device comprising measuring means for measuring any one of quantity of flow and flow rate in a tubular passage for a fluid to be measured, and flow rectifiers arranged upstream and downstream of said measuring means, said flow rectifiers containing a plurality of cells wherein a ratio $W_1/D$ of a smaller width $W_1$ of said cells to an inner diameter D of said tubular passage is less than 0.2 and a ratio $L/W_1$ of a distance L between said measuring means and the upstream flow rectifier to said smaller width $W_1$ of said cell is within $5 \leq L/W_1 \leq 25$.

15. A fluid measuring device as set forth in claim 14, wherein in case of a rectangular crosssectional passage, instead of said inner diameter D, use is made of a diameter D' of a circle whose area is equal to a crosssectional area of said rectangular passage.

* * * * *